Patented July 16, 1929.

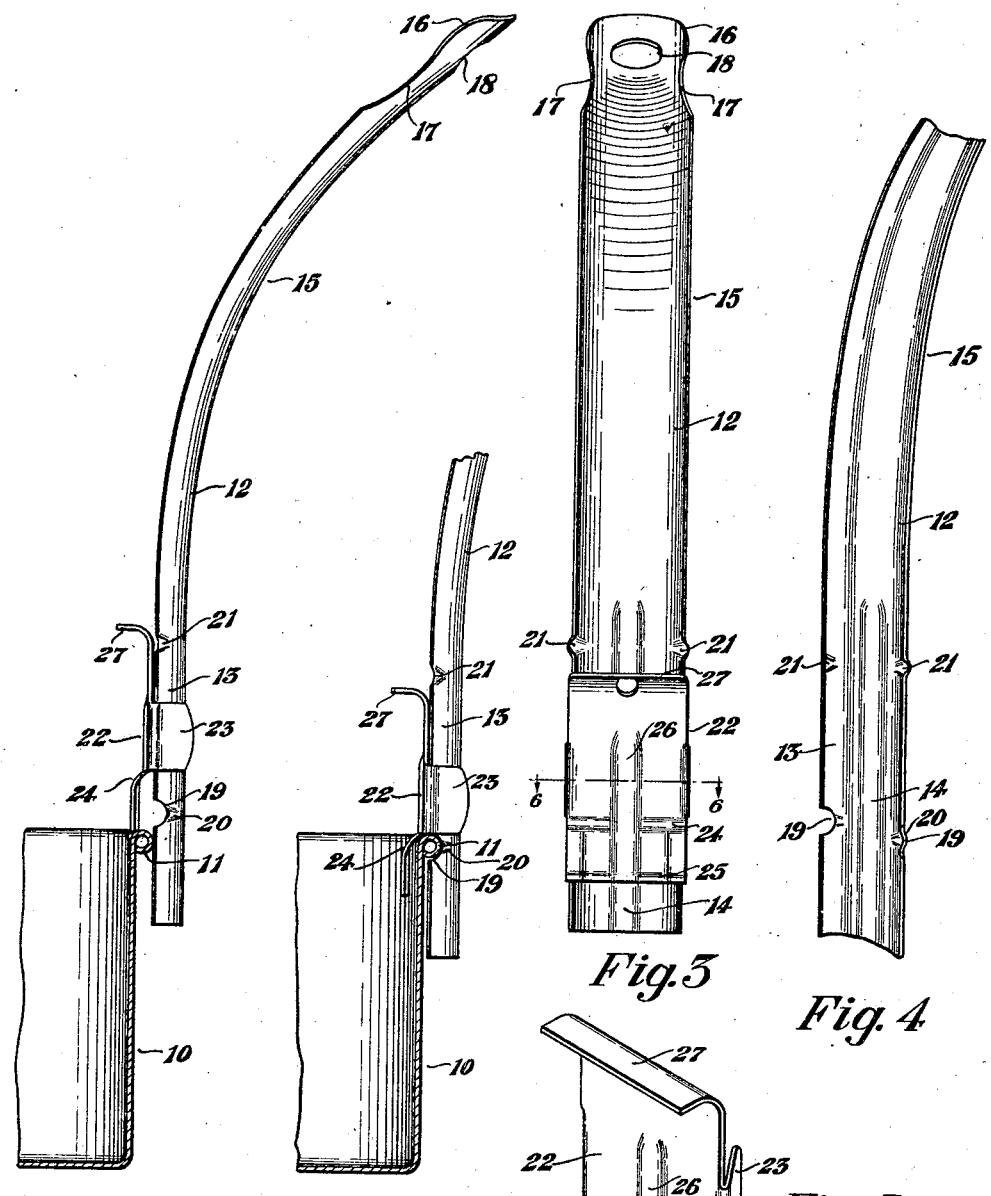

1,721,354

UNITED STATES PATENT OFFICE.

KIRK E. PORTER, OF WOOSTER, OHIO, ASSIGNOR TO THE BUCKEYE ALUMINUM COMPANY, OF WOOSTER, OHIO, A CORPORATION OF OHIO.

PAN LIFTER.

Application filed August 4, 1928. Serial No. 297,401.

The invention relates to removable handles for lifting pans and the like, and is adapted for use upon any kind of cooking or kitchen utensil provided with a rim bead, being particularly useful in removing the pans from the interior of so-called waterless cookers.

The object of the improvement is to provide a pan lifter comprising a detachable handle arranged to automatically engage the rim portion of a pan provided with a rim bead, when placed in operative position adjacent to the rim portion of the pan.

The above and other objects may be accomplished by constructing the device in the manner illustrated in the accompanying drawing, in which Figure 1 is a side elevation of the improved pan lifter showing the same in position to engage the rim portion of a pan;

Fig. 2, a similar view showing the pan lifter engaged with the rim portion of the pan;

Fig. 3, a front elevation of the improved pan lifter;

Fig. 4, a perspective view of the handle portion of the pan lifter with the sliding locking plate removed;

Fig. 5, an enlarged detail perspective view of the sliding locking plate; and

Fig. 6, a section on the line 6—6, Fig. 3.

Similar numerals refer to similar parts throughout the drawing.

The improved pan lifter to which the invention pertains is adapted for use upon any kind of pan or cooking utensil such as indicated generally at 10, which is provided with a bead or roll at the rim, as shown at 11.

The handle 12 of the improved pan lifter may be of the general form of handles for saucepans, stewpans and the like. This handle is of arcuate cross section throughout its length and comprises the substantially straight lower portion 13 which may be provided with the longitudinally reinforcing rib 14; the upper portion of the handle being gradually curved outward or backward as shown at 15, terminating in the rounded end 16 having the side edges cut away as at 17, in usual manner, to fit the hand, an aperture 18 being preferably formed in the upper end for hanging the handle upon a nail or hook when not in use.

Spaced from the lower end of the handle, a notch 19 is formed in each side edge thereof, of a size to receive the bead or roll 11 of the pan to be lifted. Projections 20 are formed in the edges of the handle adjacent to the notches 19 and similar projections 21 are formed at a distance spaced above the notches, providing stops to limit the movement of the locking plate shown generally at 22.

This sliding locking plate is provided upon each side with the backturned angular ear 23 for slidably connecting the locking plate to the handle. These ears are adapted to contact with the stop projections 20 and 21 to limit the upward and downward movement of the locking plate upon the handle.

The lower portion of the locking plate may be offset as at 24 and slightly curved as at 25 to permit the same to be received over the edge of a round pan. A reinforcing rib 26 may be provided through the locking plate for strengthening the same and the upper end thereof may be provided with the outturned flange 27 by means of which the locking plate may be raised to disengage the pan lifter from the pan.

In order to lift a pan or the like, it is only necessary to grasp the handle portion of the lifter in one hand and place the same in position adjacent to the rim of the pan when the lifter will automatically grip the pan without manual assistance.

As shown in Fig. 1, the handle is placed in position against the bead or roll 11 of the pan with the sliding locking plate contacting upon the top of the bead. A downward movement of the handle will engage the bead 11 of the pan in the notches 19 of the handle and permit the sliding locking plate to drop into the position shown in Fig. 2, locking the handle upon the pan. The pan may then be picked up bodily and moved to any desired location, by means of the handle.

In order to release the pan lifter from the pan, it is only necessary to engage the finger under the flange 27 and raise the locking plate, disengaging the handle from the pan and permitting the same to be removed.

I claim:

1. A pan lifter for a pan and the like having a bead at its rim, said pan lifter including a handle provided with notches near its lower end for engaging the bead of the pan and a sliding locking plate upon the handle for locking the handle in engagement with said bead.

2. A pan lifter for a pan and the like having a bead at its rim, said pan lifter including a handle provided with notches near its lower end for engaging the bead of the pan, a sliding locking plate upon the handle for locking the handle in engagement with said bead, and means upon the handle for limiting the movement of the locking plate thereon.

3. A pan lifter for a pan and the like having a bead at its rim, said pan lifter including a handle provided with notches near its lower end for engaging the bead of the pan and a sliding locking plate upon the handle for locking the handle in engagement with said bead, the locking plate being adapted to slide into locking position by gravity.

4. A pan lifter for a pan and the like having a bead at its rim, said pan lifter including a handle provided with notches near its lower end for engaging the bead of the pan and a sliding locking plate upon the handle for locking the handle in engagement with said bead, the locking plate being adapted to automatically slide into locking position.

In testimony that I claim the above, I have hereunto subscribed my name.

KIRK E. PORTER.